(12) United States Patent
Brunsch et al.

(10) Patent No.: US 12,240,520 B2
(45) Date of Patent: Mar. 4, 2025

(54) METHOD AND SYSTEM FOR ASCERTAINING AN ORIENTATION OF A TRAILER RELATIVE TO A TRACTOR VEHICLE

(71) Applicant: SAF-HOLLAND GmbH, Bessenbach (DE)

(72) Inventors: Bernd Brunsch, Dreieich (DE); Mark Hartmann, Heigenbrücken (DE); Mario Sebastian Köster, Bodman-Ludwigshafen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 225 days.

(21) Appl. No.: 17/760,499

(22) PCT Filed: Feb. 10, 2021

(86) PCT No.: PCT/EP2021/053131
§ 371 (c)(1),
(2) Date: Aug. 10, 2022

(87) PCT Pub. No.: WO2021/160637
PCT Pub. Date: Aug. 19, 2021

(65) Prior Publication Data
US 2023/0055942 A1  Feb. 23, 2023

(30) Foreign Application Priority Data
Feb. 12, 2020  (DE) ..................... 10 2020 103 597.7

(51) Int. Cl.
*B60D 1/24* (2006.01)
*B62D 13/00* (2006.01)
*B62D 15/02* (2006.01)

(52) U.S. Cl.
CPC ........... *B62D 15/02* (2013.01); *B62D 13/005* (2013.01); *B62D 15/025* (2013.01)

(58) Field of Classification Search
CPC ...... B60D 1/245; B62D 13/00; B62D 13/005; B62D 13/025; B62D 13/06; B62D 15/025
(Continued)

(56) References Cited

U.S. PATENT DOCUMENTS

2018/0057052 A1  3/2018 Dodd et al.
2019/0337343 A1* 11/2019 Ramirez Llanos ....... G06T 7/70
(Continued)

FOREIGN PATENT DOCUMENTS

DE         10326190 A1  12/2004
DE    102017011177 A1   6/2019
(Continued)

OTHER PUBLICATIONS

European Patent Office; International Search Report; May 7, 2020; entire document.

*Primary Examiner* — Erick R Solis
(74) *Attorney, Agent, or Firm* — Price Heneveld LLP

(57) ABSTRACT

A method for ascertaining an orientation of a trailer relative to a tractor vehicle, wherein the tractor vehicle comprises a detection device which detects a first object region on the trailer and a second object region on the trailer, including recording the first and second regions by the one detection device, providing the recording to an evaluation device, assigning first and second information items to the first and second regions, and determining the orientation of the trailer relative to the tractor vehicle on the basis of the first and second information items by the evaluation device, wherein the evaluation device is configured for recognition in the first and/or second object regions, wherein the component located inside the first and/or second object regions com-
(Continued)

prises a supporting jack and/or a supporting jack base and/or a reinforcing cross and/or a connecting shaft.

19 Claims, 8 Drawing Sheets

(58) Field of Classification Search
USPC .......................................................... 701/41
See application file for complete search history.

(56) References Cited

U.S. PATENT DOCUMENTS

| | | | |
|---|---|---|---|
| 2019/0339704 A1* | 11/2019 | Yu | G05D 1/0225 |
| 2019/0346856 A1* | 11/2019 | Berkemeier | G05D 1/0212 |
| 2020/0039517 A1* | 2/2020 | Berkemeier | G05D 1/0231 |
| 2021/0170821 A1* | 6/2021 | Staudacher | B62D 15/0285 |
| 2023/0294767 A1* | 9/2023 | Ramirez Llanos | B62D 13/06 |
| | | | 701/41 |

FOREIGN PATENT DOCUMENTS

| | | | |
|---|---|---|---|
| WO | 2019202317 A1 | 10/2019 | |
| WO | 2019231470 A1 | 12/2019 | |
| WO | 2019231472 A1 | 12/2019 | |

* cited by examiner

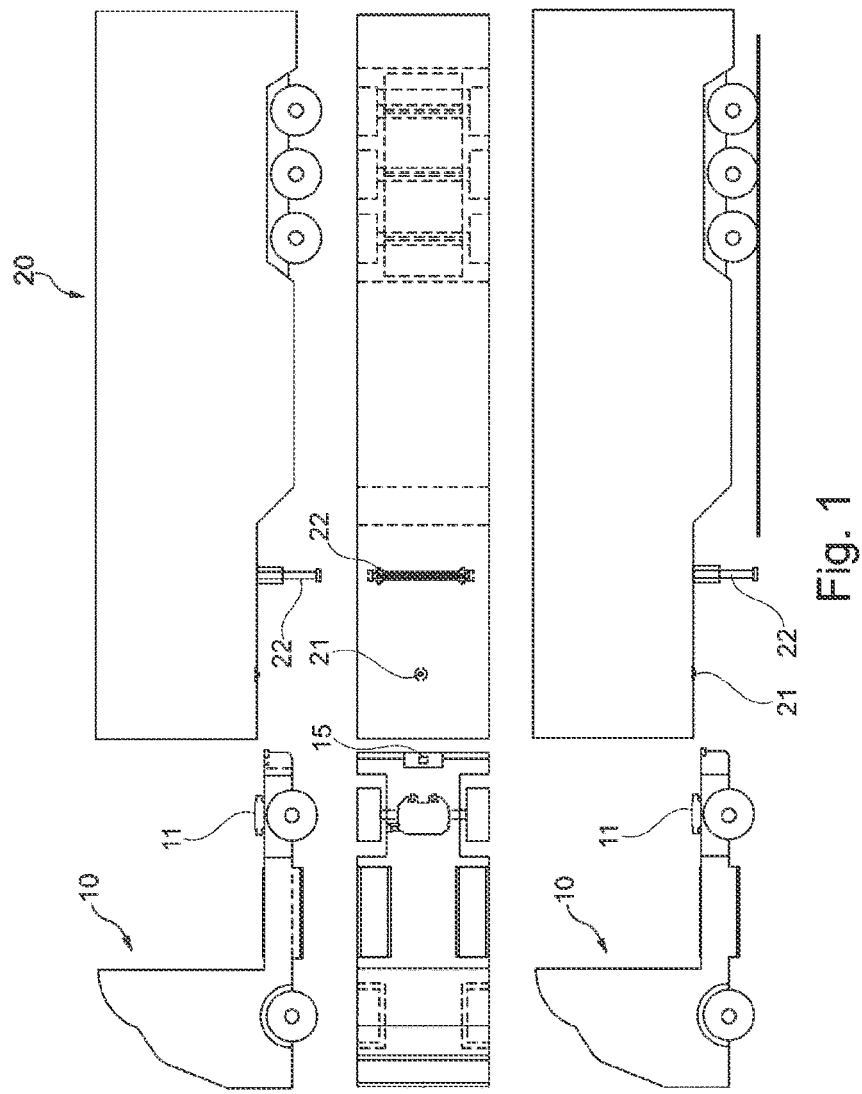

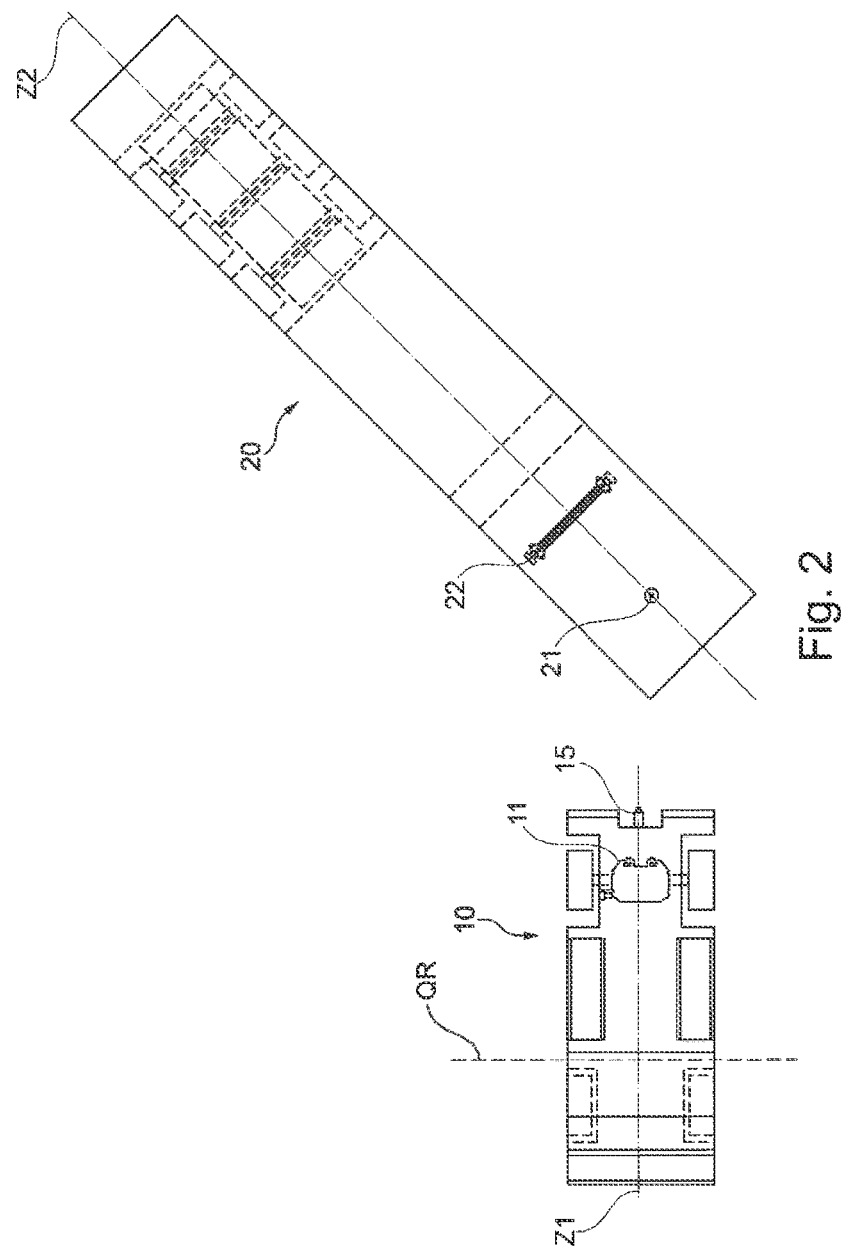

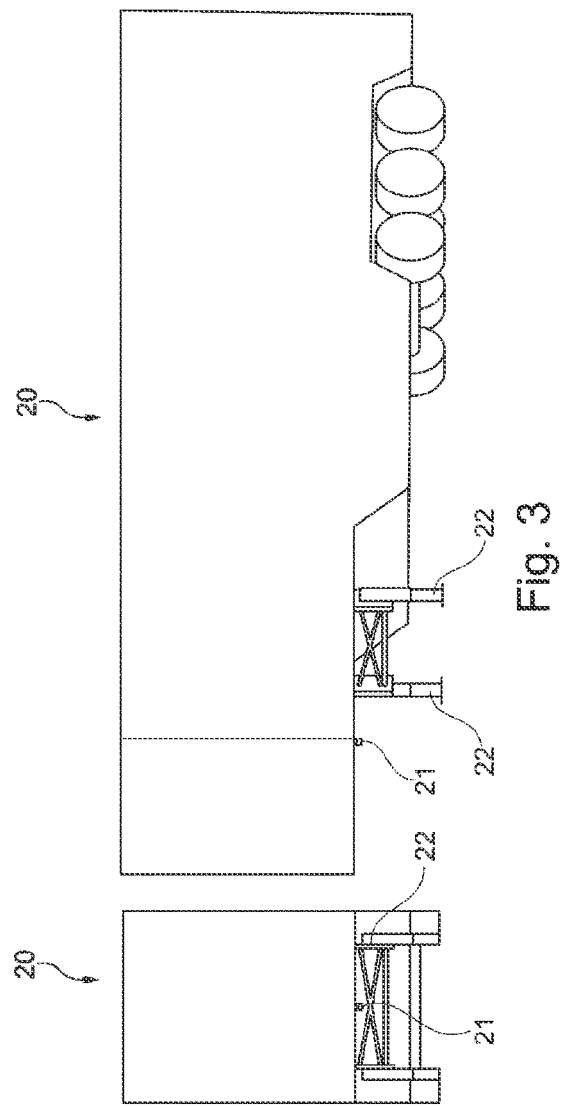

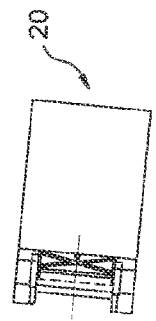 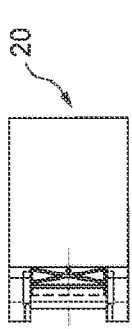 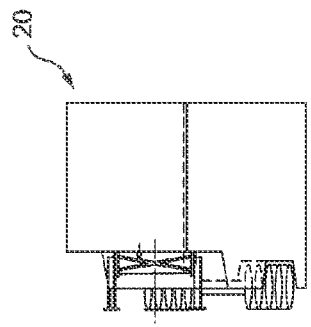
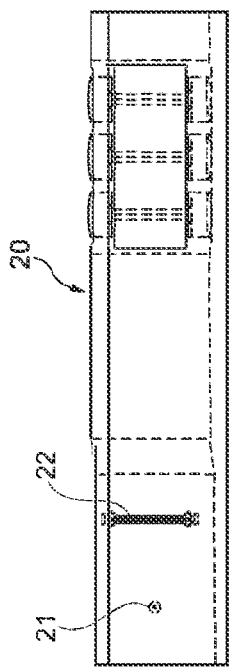
Fig. 4a
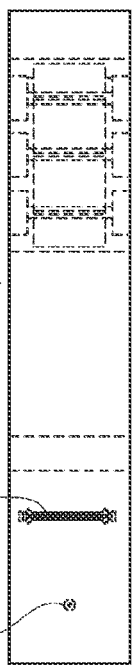
Fig. 4b
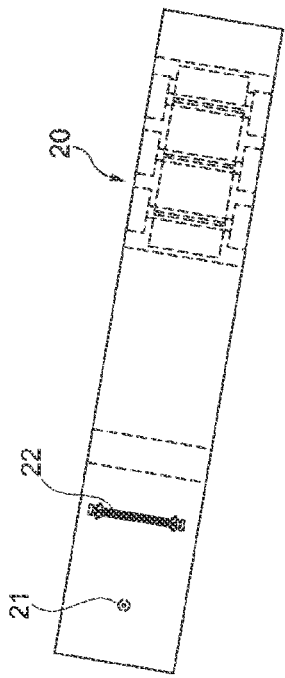
Fig. 4c

METHOD AND SYSTEM FOR ASCERTAINING AN ORIENTATION OF A TRAILER RELATIVE TO A TRACTOR VEHICLE

BACKGROUND OF THE INVENTION

The present invention relates to a method and a system for ascertaining an orientation of a trailer relative to a tractor vehicle.

Coupling processes between trailers and tractor vehicles, which are carried out manually, are well known in the prior art. In this case, a driver typically drives with the tractor vehicle in reverse until, for example, a kingbolt engages in a corresponding coupling apparatus, in particular the semitrailer linkage, on the tractor vehicle. In this case, the driver is typically guided with the aid of their side-view mirror or assisted in this regard by colleagues beside the vehicle.

For automation of the coupling process between a trailer and a tractor vehicle, it is of crucial importance to be able to determine the current orientation state of the trailer relative to the tractor as accurately as possible, in order to be able to control the coupling process accordingly with the aid of the correspondingly ascertained information relating to the orientation. DE 10 2018 205 981 A1 discloses a method in which the current orientation of the trailer relative to the tractor vehicle is ascertained by means of a detection device, for example by means of a camera or an ultrasound sensor, with the aid of the separation of the detection device from an object arranged underneath the trailer.

On the basis of this background, the object of the present invention is to provide a method and a system for ascertaining an orientation of a trailer relative to a tractor vehicle, which is improved relative to the methods and systems known from the prior art, particularly in respect of its usability or complexity.

SUMMARY OF THE INVENTION

According to a first aspect of the present invention, a method is provided for ascertaining an orientation of a trailer relative to a tractor vehicle, in particular an orientation of a semitrailer relative to a semitrailer tractor, wherein the tractor vehicle comprises at least one detection device which detects a first object region on the trailer and a second object region on the trailer comprising:
  (a) recording the first object region and the second object region by means of the at least one detection device;
  (b) providing the recording detected by the at least one detection device to an evaluation device;
  (c) assigning a first information item to the first object region and a second information item to the second object region by means of the evaluation device, and
  (d) determining the orientation of the trailer relative to the tractor vehicle on the basis of the first information item and the second information item by means of the evaluation device.

Compared with the methods known from the prior art for ascertaining an orientation of a trailer relative to a tractor vehicle, according to the invention a first object region and a second object region are detected on the trailer, and these first and second object regions are respectively assigned at least one first information item and/or second information item, which are in turn used to ascertain the current orientation of the trailer relative to the tractor vehicle. In particular, a comparison between the first information item and the second information item on the trailer is used. This distinguishes it from methods in which the separation between an object and the at least one detection device is determined. Instead, information items relating to the orientation are determined with the aid of two information items, namely the first and the second information item, in the recording of the trailer itself, particularly in a recording recorded along a projection direction. In this way, for example, elaborate triangulation that would otherwise be necessary can be obviated. In particular, the recording is a two-dimensional projection representation of the first object region and the second object region along the projection direction of the at least one detection device. Furthermore, it is possible to collect enough information items to determine the orientation of the trailer with only a single detection device, for example a single camera. Correspondingly, it would not be necessary to arrange a multiplicity of detection devices and/or sensors on the tail end, or the rear end, of the tractor vehicle, as is for example conventional in the prior art. In this case, in particular, the first object region and the second object region are arranged on the trailer in different planes in relation to the longitudinal direction of the trailer. In this way, for example, determination of the orientation of the trailer can be carried out using a relative position or relative-position of the first object region relative to the second object region. For example, the position of the first object region relative to the position of the second object region, particularly in a projected recording of the first object region and the second object region, therefore represents a first information item or a second information item, which may be employed to determine the orientation of the trailer relative to the tractor vehicle.

Preferably, the system is configured so that the data of a single detection device are sufficient to obtain first information items of the first object region and second information items of the second object region and determine the orientation. In this case, besides the single detection device, at least one additional detection device which provides redundancy with the single detection device may be envisioned. In this case, in the event of failure or view obstruction of the single detection device, the additional detection device is used to undertake the task of the detection device and provide the data to the evaluation unit. In particular, the single detection device and the additional detection device do not provide data which are evaluated jointly, or together, by the evaluation unit.

In particular, the determination of the orientation of the trailer is carried out on the basis of the data which have been recorded by a single detection device. In this case, for example, it is possible to change between the recorded data of different detection devices if, for example, it is established that the quality of the data of the one detection device is insufficient. It is also envisionable for the determination of the orientation to be checked with a further detection device, the data of which are evaluated independently of the data of the detection device by means of the evaluation device. Preferably, the data of the detection device and the further detection device are therefore not evaluated jointly, for example by their different positionings being employed to obtain depth information items or the like.

It is furthermore conceivable that only data of a single detection device are detected at a given time. In this case, the detection of data may change over time between the detection device and an additional detection device. For example, a plurality of detection devices are fitted on a tractor vehicle and detection of data and isolated determination of the orientation of the trailer are carried out successively. In this way, the individual results may be compared directly with one another and it is possible to prevent a detection device from being unable to provide reliable information relating to the orientation of the trailer, for example because of a view obstruction.

Preferably, the at least one detection device is an optical sensor, in particular a camera, which is preferably arranged centrally on the tractor vehicle in the transverse direction. The use of a camera is found to be advantageous in particular since an operating state, or a coupling state, of the component in the first object region and the second object region can jointly be detected in addition by means of the camera. For example, by means of the camera and by using the evaluation device it is possible to establish whether the supporting jacks have been extended and/or are in a state suitable for coupling. Furthermore, it is possible to establish whether the path or the intermediate region between the trailer and the tractor vehicle is free of items which would otherwise impede a linkage or coupling process. At the same time, for example, it is possible to identify irregularities on the ground which could impede the extended supporting jack, in particular, as an obstacle during the coupling process. Correspondingly, a detection device configured as a camera may be used in several ways for the planned coupling process. "Centrally" is intended in particular to mean arrangement within a tolerance of +/−15 cm in relation to the exactly measured center of the tractor vehicle in the transverse direction. The preferably central arrangement of the detection device is found to be advantageous in particular since a displacement of the first and/or second object region relative to the center of the image recorded by the detection device may as a result already be used to quantify a separation and/or an orientation of the trailer relative to the tractor vehicle. Furthermore, it is conceivable for the first object region and/or the second object region to be arranged underneath the trailer. As an alternative, it is conceivable for the first and/or second object region to be arranged on an upper side of the trailer. For example, they may be corresponding markings and/or corners on the upper side of the trailer. For this purpose, for example, it is conceivable for the detection device to be mounted on an upper side of a driver's cab on the tractor vehicle, in particular so that the camera records the rear area of the tractor vehicle. As an alternative or in addition, for example, it is conceivable for markings to be placed deliberately on the trailer in order to form a first or second object region. For example, such markings are flat signs which are mounted on the trailer in different planes as seen in the longitudinal direction and with the aid of the relative position of which it is respectively possible to derive the corresponding first and second information items, which are subsequently used to determine the orientation of the trailer relative to the tractor vehicles. Such use of signs may for example simplify the evaluation mechanism, for example the item or object recognition, particularly when, for example, the signs have a corresponding color marking which is particularly easy to identify. In this way, errors in the item or object recognition may optionally be minimized.

Preferably, the evaluation device is configured for item recognition in the first object region and/or the second object region. In this case, in particular, the recording provided to the evaluation device, which for example or in particular represents a projection of the first object region and the second object region in a projection direction running parallel to the midaxis of the tractor vehicle, is also configured to carry out object and/or item recognition. Such item or object recognition allows, for example with the aid of the recorded contours, assignment of the first and/or second object region to a particular component on the trailer. In respect of item recognition or object recognition, reference is explicitly to be made to the disclosure content of EP 1 497 160 B2, EP 2 535 841 B1, DE 10 2006 020 387 B4, EP 1306603 B2 and EP 104 0366 B1. For example, the component located inside the first object region and/or second object region is a kingbolt and/or a baseplate and/or a counter-plate and/or a supporting jack and/or a supporting jack base and/or a reinforcing cross and/or a connecting shaft and/or a wheel well and/or a tire. Furthermore, besides the relative positions of the first object region relative to the second object region in the preferably two-dimensional projection recording of the detection device, a size, i.e. a dimensioning, and/or an orientation of the component in the first and/or second object region may also be used as first and/or second information items in order to ascertain knowledge relating to the current orientation of the trailer relative to the tractor vehicle. Preferably, the first object region and/or the second object region has a size of at least 10 centimeters so that the detection device can ascertain the first and/or second object region even when there are large separations between the trailer and the tractor vehicle.

Preferably, the detected recording is a projection representation of the first object region and the second object region along a projection direction running parallel to a midaxis of the tractor vehicle.

Particularly preferably, the first information item is compared with the second information item in order to determine the orientation of the trailer relative to the tractor vehicle. For example, the respective detected positions of the first object region and the second object region are compared with one another and the orientation is determined with the aid of the relative position of the first object region and the second object region. For example, it is however also conceivable for the respective orientation, that is to say the respective extent direction of the first object region or of a component in the first object region, or of the second object region or of a further component in the second object region, to be employed as a first and/or second information item, and for the relative orientation of the respective lengths, or extent lengths, of the first object region and the second object region, or of the first component and a further component, in the recording to be compared with one another in order to ascertain the current orientation of the trailer relative to the tractor vehicle.

Expediently, a separation of the at least one further detection device or of the at least one detection device, on the one hand, and the first object region and/or the second object region, on the other hand, is additionally ascertained or detected by means of at least one further detection device and/or by means of the at least one detection device. In this way, it is advantageously possible to provide a certain degree of redundancy, which provides reliability, particularly in cases in which the view is blocked for the detection device and/or further detection device and/or is compromised by a defect. By means of the further detection device, which comprises for example a LIDAR sensor, RADAR sensor, ultrasound sensor and/or another type of contactless separation sensor, the current orientation of the trailer with respect to the tractor vehicle may be ascertained for example by means of triangulation.

Preferably, the at least one further detection device is arranged separated from the at least one detection device. In this way, it is advantageously possible to provide a further viewing angle or a further perspective, from which the first object region and/or the second object region is surveyed for the purpose of determining the orientation of the trailer relative to the tractor vehicle. This is found to be advantageous particularly when the at least one detection device and/or the at least one further detection device is restricted in respect of its view. For example, it is also conceivable for the at least one further detection device and the at least one detection device respectively to be a camera. For example, when it is raining the at least one detection device may be restricted in respect of its recording capability or the recording may be compromised in such a way that item or object recognition is no longer possible inside the recording, so that it is advantageous to resort to an alternative for the identification or object recognition. For this purpose, the at least one further detection device, which in particular is arranged separated from the at least one detection device, is found to be advantageous.

Preferably, the determined or ascertained orientation is used to control and/or drive the tractor vehicle and/or the trailer. In this way, it is advantageously possible to use the coupling mechanism on the basis of the ascertained orientation information for autonomous or automated coupling of the trailer to the tractor vehicle.

Preferably, a recording of the first object region at a first instant and a further second instant is respectively made by the at least one detection device, the first information item being assigned at the first instant and a further first information item being assigned at the second instant to the first object region, a temporal variation in the orientation of the trailer with respect to the vehicle being determined with the aid of a comparison of the first information item and the further first information item. For example the first information item and the further first information item are in this case the absolute sizes which are assigned to the respective component in the first object region. By a corresponding size change between the first instant and the second instant, a separation variation which has taken place between the second instant and the first instant may thereby be detected. In this way, for example, a speed of the trailer or of the relative movement of the trailer relative to the tractor vehicle may also be ascertained. It is also envisionable to predict future variations, for example to estimate and predict a driving path.

In particular, separations and distances in the recording registered by the detection device may be ascertained in that, for example, each pixel in the recording is assigned either to the first object region, to the second object region and/or to a further region. The separation between the first region and the second region may then be detected with the aid of the pixels which are in turn arranged between the first object region and the second object region, that is to say they are assigned to the further region between the first object region and the second object region. With the aid of the measured or counted pixels, the separation between the first object region and the second object region may then be detected quantitatively. This applies in particular when the actual dimensions of the recognized component are known and the distance to the camera can furthermore be ascertained. In this case, it is advantageous fora detection angle of the camera to be known, in order to carry out an evaluation by means of trigonometry and pixel numbers. Preferably, the detection device is configured in such a way that a maximally sharp recording of the first object region and/or the second object region is provided both in the plane of the first object region and in the plane of the second object region. For this purpose, it is advantageous to ensure that the first object region and the second object region lie in planes which are no more than eight meters, preferably no more than five meters, and particularly preferably no more than three meters away from one another. In this way, it is possible to ensure that the first object region and the second object region can be recorded with a sufficient sharpness that provides sufficiently accurate information items, in particular for the object recognition and/or position determination, which allows the orientation of the trailer relative to the tractor vehicle so that automated coupling of the trailer in relation to the tractor vehicle, i.e. automated coupling, is possible.

Preferably, the method is carried out in a decoupled state between the tractor vehicle and the trailer. In particular, the trailer and the tractor vehicle are for example 10 or 15 meters away from one another in a yard, in order subsequently to carry out automated coupling with the aid of the information ascertained by the method relating to the respective orientations.

Expediently, a first set of information items is assigned to the first object region and a second set of information items is assigned to the second object region by means of the evaluation device, the orientation of the trailer relative to the tractor vehicle being determined on the basis of the first set of information items and/or the second set of information items. In this case, for example, the set of information items, i.e. first information items and second information items, may be different types of information. In order to determine the orientation of the trailer, for example, both the size and/or the position and/or the separation and/or the inclination of the first and/or second object region is included in the first set and/or second set of information items. In this way, redundant and/or additional information items, which are necessary for successful linkage during automated coupling, or autonomous linkage, may optionally be ascertained.

Preferably, the first object region and/or the second object region comprises a component of the trailer. In this way, it is advantageously not necessary to rely on fitting an additional surface to be identified on the trailer. Instead, components already found on the trailer anyway, in particular on the bottom side or lower side of the trailer, are used to serve as a reference and/or as a first object region or as a second object region. It is also envisionable for lateral components of the trailer, for example loops and/or buckles, with which a tarpaulin is mounted on the trailer, to be employed as a first and/or second object region.

A further subject of the present invention is a system for carrying out the method according to the invention, the system comprising at least one detection device and at least one evaluation device. All features and subjects described for the method may be applied similarly to the system, and vice versa.

BRIEF DESCRIPTION OF THE DRAWINGS

Further advantages and features may be found in the following description of preferred embodiments of the subject of the invention with reference to the figures. Individual features of the individual embodiments may in this case be combined with one another in the scope of the invention.

FIG. 1 is a tractor and a trailer for a method according to an exemplary embodiment of the present invention in a bottom view and two side views;

FIG. 2 is the tractor and the trailer of FIG. 1 in a further plan view;

FIG. 3 is the tractor and the trailer of FIGS. 1 and 2 in a further side view and perspective representation;

FIGS. 4a to 4c are the trailer of FIGS. 1 to 3 in a bottom view and the further side view of various orientations;

FIG. 5 is the trailer in the further side view of FIG. 4a;

DETAILED DESCRIPTION OF THE PREFERRED EMBODIMENTS

Figure 5:
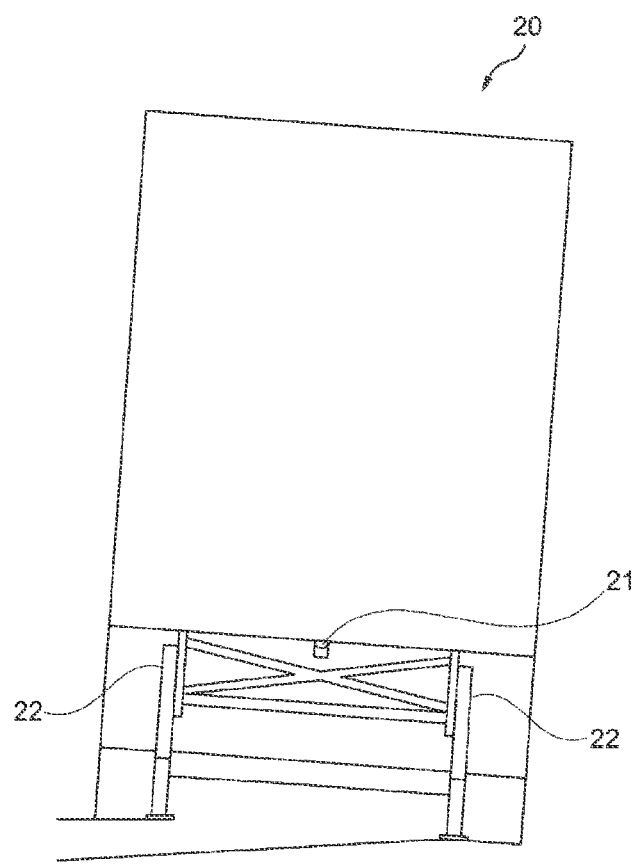

FIG. 1 schematically represents a system consisting of a tractor vehicle 10 and a trailer 20, in particular a semitrailer. Such a system consisting of a semitrailer or trailer 20 and a tractor vehicle 10 is preferably coupled together by means of a coupling mechanism. For this purpose, the tractor vehicle 10 comprises for example a coupling plate 11, in which a kingbolt of the trailer 20 engages in the coupled state. For this purpose, the kingbolt is typically or conventionally inserted, or inserted and fixed for example by means of a hook-shaped element on the coupling plate 11, into a corresponding slot-shaped recess of the coupling plate 11.

For automated or autonomous coupling of the trailer 20 to the tractor vehicle 10, at least one detection device 15 is provided, which is arranged on the tractor vehicle 10 and is intended to establish the orientation, in particular the relative orientation, of the trailer 20 relative to the tractor vehicle 10. The term orientation is intended in particular to mean the separation of the trailer 20 from the tractor vehicle 10 and/or the relative inclination of the midaxes Z1, Z2, respectively extending in the longitudinal direction of the tractor vehicle 10 and of the trailer 20, with respect to one another. The detection device 15 is preferably a camera. This detection device 15 is for example arranged centrally as seen in the transverse direction QR of the tractor vehicle 10. Preferably, the detection device 15 is arranged behind the linkage plate 11 as seen in the driving direction of the tractor vehicle 10, and for example mounted on the terminal or rear end of the tractor vehicle 10. In this case, the central orientation or arrangement of the detection device 15 means that the detection device 15 is substantially arranged at the height of the midaxis Z1 of the tractor vehicle as seen in the transverse direction QR. Preferably, the system comprises only a single camera, or detection device 15, for determining an orientation of a trailer 20 and a tractor vehicle 10.

Preferably, the detection device 15 is configured in such a way that it detects a first object region 21 on the trailer 20 and a second object region 22 on the trailer 20 during operation. For this purpose, the detection device 15 must correspondingly be configured in such a way that it detects a corresponding rear area of the tractor vehicle 10 and/or comprises a lens system with which both a first object region 21 and a second object region 22 can be detected, the first object region 21 and the second object region 22 being arranged mutually offset in the longitudinal direction of the trailer 20. Preferably, the at least one detection device 15 is configured in such a way that it can be focused both in a plane of the first object region 21 and in a plane of the second object region 22, a separation between the plane of the first object region 21 and the plane of the second object region 22 comprises a separation of between 1.5 and 8 meters, preferably between 0.5 and 5 meters, and particularly preferably between 0.8 and 7 meters.

In particular, the at least one detection device 15 records a recording of the first object region 21 and the second object region 22 during operation by means of the at least one detection device 15. The recording of the first object region 21 and the second object region 22 recorded by means of the at least one detection device 15 is subsequently provided to an evaluation device, or forwarded thereto. The evaluation device assigns at least one information item to the first object region 21 and at least one second information item to the second object region 22. The first information item and/or second information item may, for example, be a classification of the first object region 21 and/or second object region 22. For example, the evaluation device identifies with the aid of the recording made that the first object region 21 is a kingbolt and the second object region 22 is a supporting jack, or a part of a supporting jack. The evaluation device is preferably configured for object or item recognition. For this purpose, for example, individual pixels of the image recorded by the camera are respectively assigned to a first object region 21, in particular a component of the trailer 20, and/or a second object region 22, in particular a further component of the trailer. Furthermore, the first information item and/or the second information item comprises for example an indication relating to the position, particularly in the recording of the at least one detection device 15, a size and/or an orientation of the first object region 21 and/or the second object region 22. With the aid of this first and/or second information item, it is then advantageously possible for the evaluation device to determine the orientation of the trailer 20 relative to the tractor vehicle 10. For example, with the aid of the relative position and/or orientation of the first object region 21 relative to the second object region 22, an oblique setting of the trailer 20 may be quantified. It is furthermore conceivable that a separation of the trailer 20 relative to the tractor vehicle 10 is, for example, ascertained with the aid of the size of the first object region 21 and the second object region 22, in particular comparison of the size of the first object region 21 and the second object region 22. In particular, it is found to be advantageous to use only a single camera and to employ the first and second information items of the respective first object region 21 and the second object region 22, since elaborate triangulation or the like can thereby be obviated. Preferably, the evaluation device resorts to a network, for example a neural network, in particular for the item or object recognition.

For example, FIG. 2 shows an oblique orientation, that is to say in particular an oblique orientation of a midaxis Z2 of the trailer 20, from the perspective of the detection device 15, which detects in particular a first object region 21 in the form of a kingbolt and the second object region 22 in the form of the supporting jack. With the aid of the relative position of the kingbolt relative to the supporting jacks, it is in this case possible to detect the extent to which the trailer 20 is set obliquely relative to the orientation of the tractor vehicle 10. In particular, the first object region 21 is in this case used as a reference for the second object region 22 in order, with the aid of this orientation of the second object region 22 relative to the first object region 21 in the recording of the detection device 15, to draw a conclusion relating to the relative orientation of the trailer 20 relative to the tractor vehicle 10. As an alternative to determining the relative position of the second object region 22, a connecting shaft and/or a counter-plate or baseplate of the trailer 20 may also be employed as the first object region 21.

FIG. 3 depicts a side view (left) of the trailer 20, in which the midaxis Z2 of the trailer 20 is arranged in alignment with the midaxis Z1 of the tractor vehicle 10. In this relative orientation of the tractor vehicle 10 and the trailer 20, the first object region 21, particularly in the form of a kingbolt, lies centrally between supporting jacks which are employed as the second object region 22. For example, a cross connection connecting the two supporting jacks may also be employed as the second object region 22. The right side view in FIG. 3 represents a side view from the perspective of the tractor vehicle 10, in which the midaxis Z2 of the trailer 20 is oriented obliquely relative to the midaxis Z1 of the tractor vehicle 10. In this orientation, the first object region 21, that is to say the kingbolt, is offset on the left side relative to the supporting jacks. With the aid of this relative position of the kingbolt, that is to say the first object region 21, relative to the supporting jacks, that is to say relative to the second object region 22, it can be detected that the midaxis Z2 of the trailer 20 is set obliquely relative to the midaxis Z1 of the tractor vehicle 10, and in particular it is possible to quantify the oblique setting, that is to say specify an angle with which the midaxis Z1 of the trailer 20 is inclined relative to the midaxis Z1 of the tractor vehicle 10.

FIGS. 4a to 4c represent three different orientations of a trailer 20 in a bottom view and in a corresponding side view (right). FIG. 4b is again an aligned orientation of the midaxis Z1 of the tractor vehicle 10 and the midaxis Z2 of the trailer 20. In FIG. 4a, a left side of the trailer 20 as seen in the vehicle direction is raised relative to the right side lying opposite in the transverse direction QR. Such an oblique setting may, for example, occur when the trailer 20 is supported with its left wheels on an elevation such as a curbside. As may be seen, the plan view (right) in such a situation shows an oblique setting relative to the conventionally substantially vertically running orientation of the supporting jack, i.e. the second object region 22. To this extent, the orientation of the second object region 22 relative to its conventional orientation may be employed here to establish whether there is a corresponding rotation of the trailer 20 about the midaxis Z2 of the trailer 20. This must optionally likewise be taken into account in the coupling. FIG. 4c once more shows a corresponding oblique setting as already discussed in connection with FIG. 3.

Figure 6:
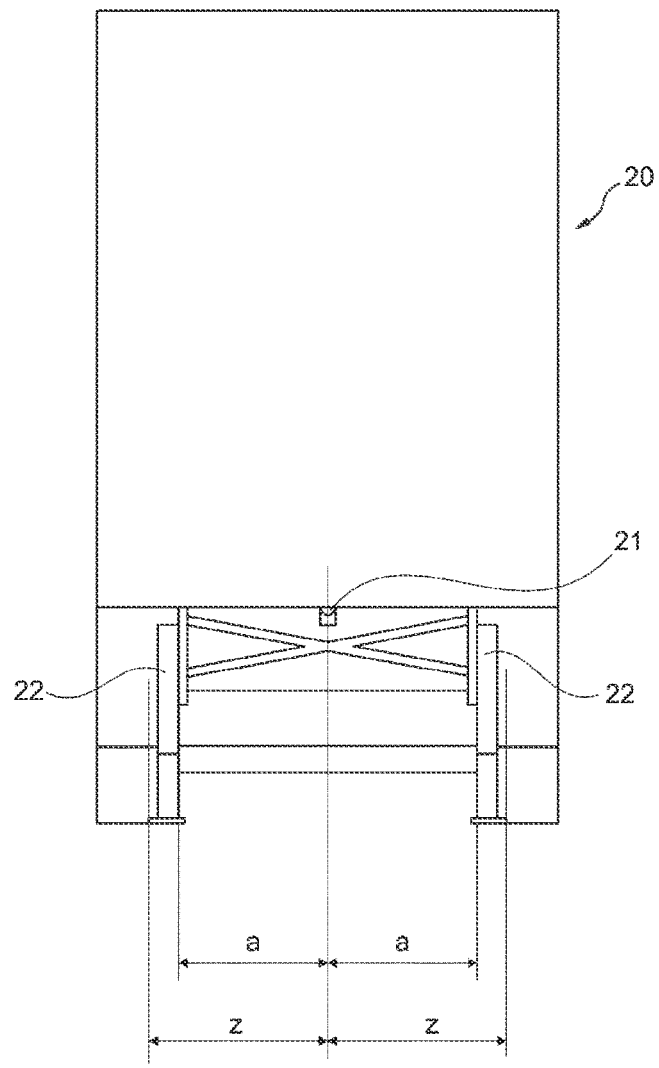
FIG. 6 is the trailer in the further side view of FIG. 4b.

FIG. 5 once again shows the tilted setting of the trailer 20, as described in FIG. 4a. FIG. 6 once again represents the aligned orientation of the midaxis Z1 of the tractor vehicle 10 and the midaxis Z2 of the trailer 20. In this representation, as detected by the at least one detection device 15, a midpoint of the connecting cross between the two supporting jacks is arranged centrally between the two supporting jacks, exactly like the connecting apparatus in the form of the kingbolt used as the first object region 21. Furthermore, the tires or wheels of the trailer 20 lie outside the region which is arranged, or lies, between the two supporting jacks mutually offset in the transverse direction.

Figure 7:
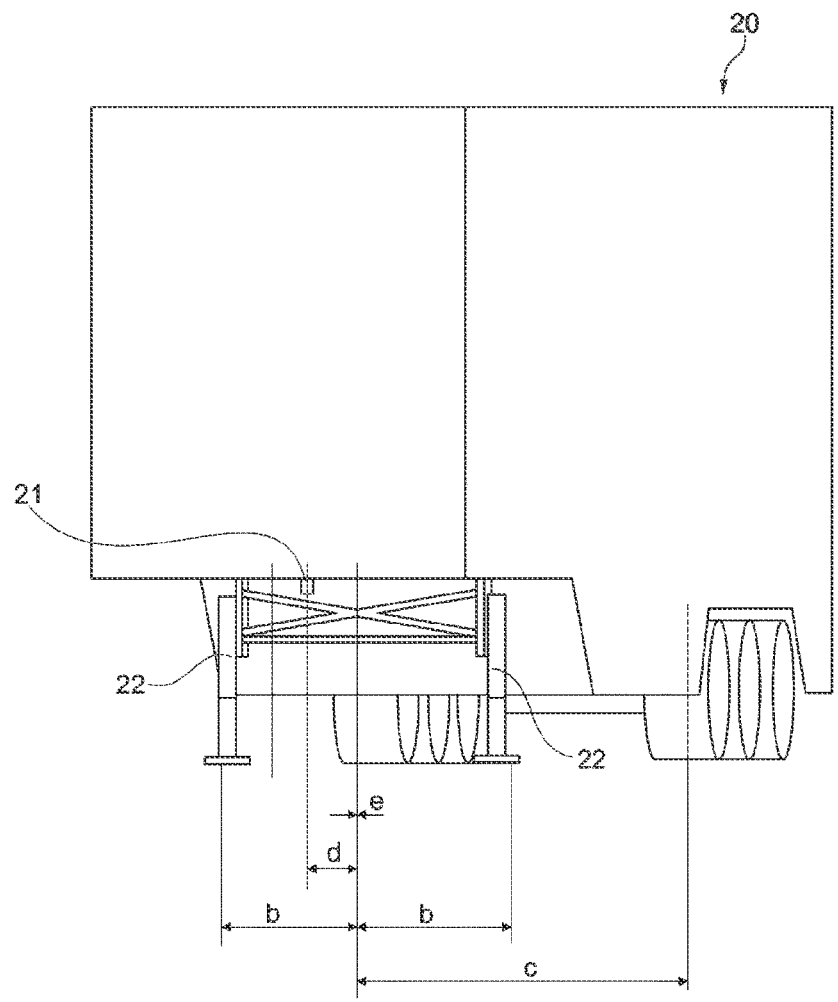
FIG. 7 is the trailer in the further side view of FIG. 4c.

In contrast thereto, FIG. 7 shows an oblique setting of the trailer 20 and an example of a recording recorded by means of the detection device. In this oblique setting, the kingbolt used as the first object region 21 is displaced by a distance d relative to the center of the connecting cross between the supporting jacks. In particular, the kingbolt used as the first object region 21 is arranged offset toward one of the two supporting jacks in the projection representation which is recorded by the at least one detection device 15. With the aid of this displacement, the oblique setting of the trailer 20 may advantageously be established or found. Besides the referencing between the first object region 21 and the second object region 22, it is advantageously possible additionally to employ a third object region, for example in the form of the wheels or in the form of the tires, for the evaluation or ascertaining of the orientation of the trailer 20 relative to the tractor vehicle. In the present case, the wheels or tires in the orientation represented in FIG. 7, detected by the at least one detection device 15, are offset by a separation c in relation to the center of the stabilizing cross between the supporting jacks 22.

Figure 8:
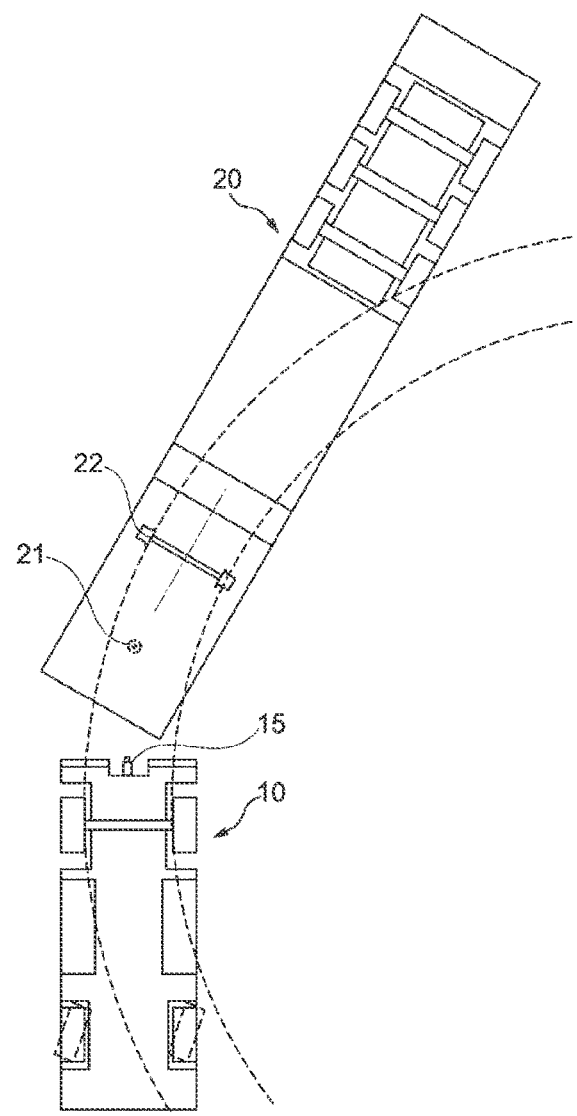
FIG. 8 is the tractor and the trailer of FIG. 1 in a bottom view.

FIG. 8 again represents the system consisting of the tractor vehicle 10 and trailer 20, particularly in a state of coupling. In particular, the movement circle or the movement relative to the tractor vehicle 10 is represented here. In this case, this movement is coordinated with the aid of the ascertained orientation, in particular current orientation, of the trailer 20 relative to the tractor vehicle 10. In this way, autonomous or automated linkage of the trailer 20 to the tractor vehicle 10 may be carried out.

REFERENCES 10 tractor vehicle
11 linkage plate or semitrailer linkage
15 detection device
20 trailer
21 first object region (for example kingbolt)
22 second object region
Z1 midaxis of the tractor vehicle
Z2 midaxis of the trailer
QR transverse direction

The invention claimed is:

1. A method for ascertaining an orientation of a trailer relative to a tractor vehicle, wherein the tractor vehicle comprises at least one detection device which detects a first object region on the trailer and a second object region on the trailer, comprising:
   recording the first object region and the second object region by at least one detection device;
   providing the recording detected by the at least one detection device to an evaluation device;
   assigning a first information item to the first object region and a second information item to the second object region by the evaluation device; and
   determining the orientation of the trailer relative to the tractor vehicle on the basis of the first information item and the second information item by the evaluation device;
   wherein the evaluation device is configured for component recognition in the first object region and/or second object region;
   wherein the component located inside the first object region and/or second object region comprises a supporting jack and/or a supporting jack base and/or a reinforcing cross and/or a connecting shaft; and
   wherein the evaluation device carries out an object recognition, wherein the object recognition assigns the first object area and/or the second object area to the component via recorded contours, and wherein the first and/or second information represents relative position of the first object area relative to the second object area, and represents a size of the components and/or an orientation of the components in the first and/or second object area.

2. The method as claimed in claim 1, wherein the at least one detection device comprises an optical sensor arranged centrally on the tractor vehicle in the transverse direction of the tractor vehicle.

3. The method as claimed in claim 2, wherein the optical sensor comprises a camera.

4. The method as claimed in claim 2, wherein the first object region is offset with respect to the second object region as seen in the longitudinal direction of the trailer.

5. The method as claimed in claim 4, wherein the detected recording is a projection representation of the first object region and the second object region along a projection direction running parallel to a midaxis of the tractor vehicle.

6. The method as claimed in claim 5, wherein a single detection device is used.

7. The method as claimed in claim 6, wherein the first information item is compared with the second information item in order to determine the orientation of the trailer relative to the tractor vehicle.

8. The method as claimed in claim 7, wherein a separation between at least one further detection device or the at least one detection device and the first object region and/or the second object region is additionally detected by the at least one further detection device or by the at least one detection device.

9. The method as claimed in claim 8, wherein the at least one further detection device is arranged separated from the at least one detection device.

10. The method as claimed in claim 1, wherein the orientation determined is used to control and/or drive the tractor vehicle and/or the trailer.

11. The method as claimed in claim 1, wherein a recording of the first object region at a first instant and a second instant is respectively made by the detection device, the first information item being assigned at the first instant and a further first information item being assigned at the second instant to the first object region, a temporal variation in the orientation of the trailer with respect to the tractor vehicle being determined with the aid of a comparison of the first information item and the further first information item.

12. The method as claimed in claim 1, wherein the method is carried out in a decoupled state between the tractor vehicle and the trailer.

13. The method as claimed in claim 1, wherein the first object region and/or the second object region comprises a component of the trailer.

14. The method as claimed in claim 1, wherein the first object region is offset with respect to the second object region as seen in the longitudinal direction of the trailer.

15. The method as claimed in claim 1, wherein the detected recording is a projection representation of the first object region and the second object region along a projection direction running parallel to a midaxis of the tractor vehicle.

16. The method as claimed in claim 1, wherein a single detection device is used.

17. The method as claimed in claim 1, wherein the first information item is compared with the second information item in order to determine the orientation of the trailer relative to the tractor vehicle.

18. The method as claimed in claim 1, wherein a separation between at least one further detection device or the at least one detection device and the first object region and/or the second object region is additionally detected by the at least one further detection device or by the at least one detection device.

19. A system for carrying out a method as claimed in claim 1, comprising:

at least one detection device configured to record the first object region and the second object region; and at least one evaluation device configured to assign a first information item to the first object region and a second information item to the second object region and to determine the orientation of the trailer relative to the tractor vehicle on the basis of the first information item and the second information item.

* * * * *